(No Model.)

H. M. HANMORE.
NON HEAT CONDUCTING VESSEL.

No. 296,955. Patented Apr. 15, 1884.

Witnesses

Inventor

UNITED STATES PATENT OFFICE.

HIRAM M. HANMORE, OF WHITE PLAINS, NEW YORK.

NON-HEAT-CONDUCTING VESSEL.

SPECIFICATION forming part of Letters Patent No. 296,955, dated April 15, 1884.

Application filed March 4, 1884. (No model.)

*To all whom it may concern:*

Be it known that I, HIRAM M. HANMORE, of White Plains, in the county of Westchester and State of New York, have invented a new and useful Improvement in Non-Conducting Vessels, of which the following is a specification.

My invention is applicable to vessels wherein liquid and solid substances are placed to avoid subjecting them to the temperature of the air, and to retain them in a cold or warm state, as the case may be.

The invention consists in the combination, with a vessel for containing liquid or solid substances, of a non-conducting covering of raw-silk waste, and calcined or carbonate of magnesia, and a surrounding jacket.

The invention also consists in the combination, with a vessel for containing liquid or solid substances, of a covering of raw-silk waste wrapped around the vessel, a coating of calcined or carbonate of magnesia applied to the raw-silk waste, a superposed layer of paper, a layer of felt applied outside the paper, a second layer of paper applied outside the felt, and an inclosing-case of wood or other suitable material.

Figure 1:
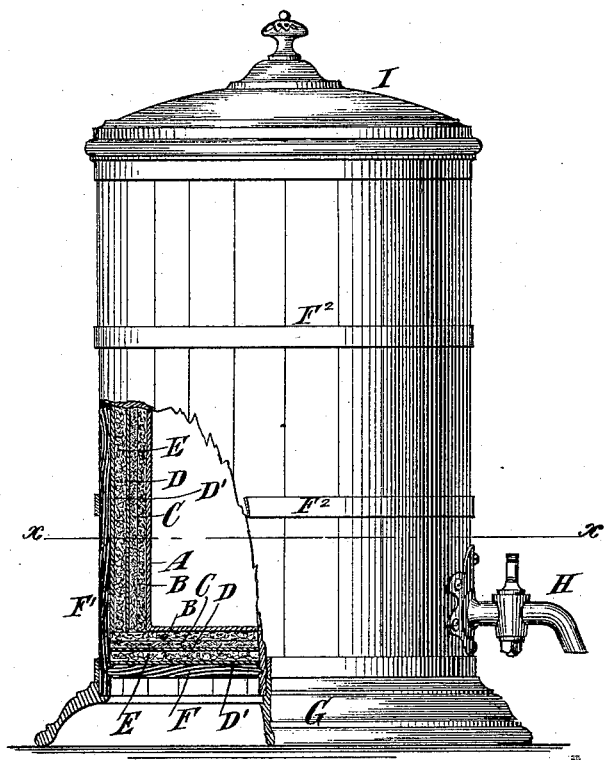
Figure 2:
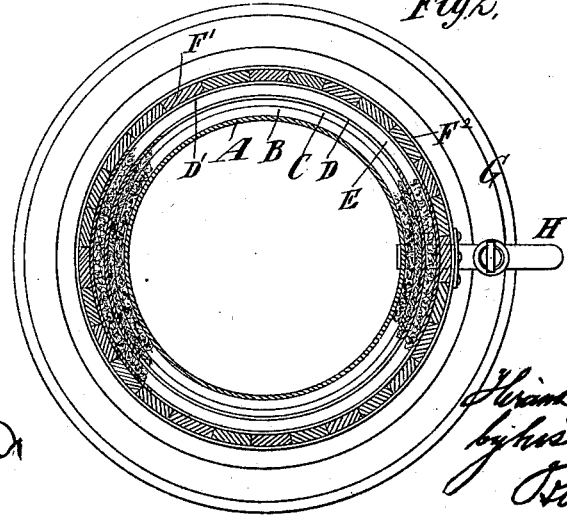

The accompanying drawings represent an ice-water cooler embodying my invention. Figure 1 is a partly-sectional elevation of the cooler, and Fig. 2 is a horizontal section thereof on the dotted line $x\ x$, Fig. 1.

Similar letters of reference designate corresponding parts in both figures.

A designates the inner shell or vessel proper, which may be made of metal, earthenware, or other suitable material, and which is here represented as cylindric in form. Around the exterior of the vessel A raw-silk waste is wrapped to form a layer or covering, B, of any thickness desired, and a similar layer, B, of raw-silk waste is applied to the bottom of the vessel.

C designates a coating of calcined or carbonate of magnesia, which is plastered on over or outside the silk waste, both at the side and bottom of the vessel, and which forms an impermeable coating. The coating of magnesia serves to retain the silk waste in place on the vessel, and the two together form a very advantageous non-conducting covering.

D is a covering or layer of paper, (stout Manila paper being preferred,) which is wrapped around outside the coating C, of magnesia, and which is also applied to the coating C on the bottom of the vessel; and outside the paper D is a superposed layer, E, of felt, composed of animal or vegetable fiber, and which is wrapped around the vessel. Outside the layer E of felt is a second layer or covering, D', of Manila or other paper, and the whole is inclosed by a case of any suitable construction. As here shown, the external case consists of a bottom, F, of wood, and a cylindric body, F', built up of staves of wood, and held together and bound around by hoops $F^2$, so as to form a strong and durable structure. The external case might be made of metal, papier-maché, or other suitable material, and may be finished or decorated in any desired manner.

G designates a base-piece, to which the cooler is fixed, and which may be of metal. H designates the cock or tap, whereby water may be drawn from the cooler.

The cover I of the cooler may be constructed similarly to the bottom—that is, with a layer of raw-silk waste, a coating of calcined or carbonate of magnesia, a layer of paper, a layer of felt, a second layer of paper, and an outer covering, superposed or applied one outside the other, as described.

I have found that a cooler constructed as described will keep the ice a long time unmelted, even in the warmest weather, and for this reason it is very economical in its operation and use. Such a cooler is particularly adapted for use in railway-cars.

The invention is applicable to ice-water pitchers, as well as to ice-water coolers, and to ice-cream freezers and vessels for carrying or delivering ice-cream, to ice-boxes and refrigerators, and, generally, to all vessels the contents of which are artificially cooled.

The invention is also applicable to milk-cans and other vessels in order to preserve the contents in a cool state, and to other vessels in which it is important to prevent or retard the cooling of the contents—such, for example, as tea and coffee pots and urns.

The calcined or carbonate of magnesia may be mixed with the raw-silk waste before the latter is wrapped round or applied to the vessel.

What I claim as my invention, and desire to secure by Letters Patent, is—

1. The combination, with a vessel for containing liquid or solid substances, of a non-conducting covering of raw-silk waste and calcined or carbonate of magnesia, and a surrounding jacket, substantially as herein described.

2. The combination, with a vessel for containing liquid or solid substances, of a covering of raw-silk waste wrapped around the vessel, a coating of calcined or carbonate of magnesia applied to the raw-silk waste, a superposed layer of paper, a layer of felt applied outside the paper, a second layer of paper outside the felt, and an inclosing-case, the whole forming a non-conducting protection, substantially as and for the purpose herein described.

H. M. HANMORE.

Witnesses:
FREDK. HAYNES,
ED. L. MORAN.